United States Patent [19]

Mestoussis

[11] 3,876,986

[45] Apr. 8, 1975

[54] DIGITAL ADDRESSING SYSTEM

[75] Inventor: Antoine Mestoussis, Nivelles, Belgium

[73] Assignee: International Standard Electric Corporation, New York, N.Y.

[22] Filed: May 1, 1974

[21] Appl. No.: 465,786

[52] U.S. Cl. .............................................. 340/168 R
[51] Int. Cl. .............................................. H04q 9/00
[58] Field of Search ........ 340/147 R, 167 R, 168 R, 340/147 P

[56] References Cited

UNITED STATES PATENTS

| | | | |
|---|---|---|---|
| 3,644,891 | 2/1972 | McCrea | 340/147 R |
| 3,821,706 | 6/1974 | Bennett | 340/147 R |

OTHER PUBLICATIONS

Gilman – "Directed Interrupt for Interface Switching," IBM Tech. Disc. Bulletin, Vol. 12, No. 12, May 1970, pp. 2249,2250.

Carthew – "Attachment Device for Interface Switch Unit," IBM Tech. Disc. Bulletin, Vol. 12, No. 12, May 1970, pp. 2251, 2252.

*Primary Examiner*—Donald J. Yusko
*Attorney, Agent, or Firm*—John T. O'Halloran; Menotti J. Lombardi, Jr.; Vincent Ingrassia

[57] ABSTRACT

An addressing system in a master station communicates with a plurality of outstations each including at least one or more groups of devices. A memory stores for each outstation and for each set therein a value indicative of the number of addresses of the groups of devices of said set. Logic means and a counter stepped by said logic means provide the addresses of the groups of devices. The logic means uses an indicative value stored in the memory to delimit the counting.

6 Claims, 2 Drawing Figures

DIGITAL ADDRESSING SYSTEM

BACKGROUND OF THE INVENTION

The present invention relates to an addressing system in a master station which is able to communicate with a plurality of outstations each including at least one set of one or more groups of devices, said addressing system providing the addresses of said outstations and of said groups of devices and being adapted to address said groups of devices in said outstations by means of said addresses said system further including memory means. Such a system is known from the article "Systeme de supervision a programme enregistre SELECTRONIC 702" by H. L. FOWLER Standard Telephones and Cables Ltd., published in the Revue des Telecommunications, Vol. 43, numero 1, 1968. In this article no details are given about the manner in which the system provides the addresses of the outstations and of the groups of devices to be addressed in each of these outstations. When in this known system the numbers of groups of devices in the various outstations is not a constant one, one may provide in the main station a group address counter for each outstation, but this is obviously an expensive solution. One may also provide in the main station a single group address counter but the latter should then obviously be able to count the highest number of groups in any of the outstations and be stepped through all its conditions when interrogating any of the out-stations even though the number of group addresses in a particular outstation may be considerably less than the number of steps through which the counter is stepped. This obviously results in loss of time.

SUMMARY OF THE INVENTION

It is an object of the present invention to provide an addressing system of the above type which permits addressing of groups of devices in various outstations in an efficient way and which may easily be adapted when the number of groups of devices in the outstations is changed.

According to a broad aspect of the invention, there is provided an addressing system in a master station which is able to communicate with a plurality of outstations each including at least one set of one or more groups of devices, said addressing system providing the addresses of said outstations and of said groups of devices and being adapted to address said groups of devices in said outstations by means of said addresses said system further including memory means, characterized in that said memory means store for each outstation and for each set therein a value indicative of the number of addresses of the groups of devices of said set and that the system further includes logic means and a counter which when stepped by said logic means provides said addresses of the groups of devices of the set(s) of each outstation, said logic means using said indicative value stored in said memory means to delimit said counting.

In this way, although using only a single group address counter and although the numbers of group addresses may be different in the various outstations the exact number is counted for each outstation since the memory means for each outstation store an indicative value limiting the steps made by the address counter. Hence, no time is lost in providing unused addresses. On the other hand when suitably chosen, the memory means permits easy change of the numbers of group addresses.

Another characteristic of the invention is that one or more of said outstations include a first and a second set of one or more groups of devices, said memory means accordingly storing for each of these outstations a first value and a second value indicative of the number of addresses of the groups of devices of said first and second sets respectively, and that said logic means provides the addresses of the groups of devices of said first set of an outstation step counter through a first number of steps equal to said first indicative value, while said logic means provides the addresses of the groups of devices of a said second set of an outstation step counter through a second number of steps equal to a value corresponding to an end position of said counter minus said second indicative value.

The first set contains groups of devices the state of which changes relatively frequently while the second set contains groups of devices the state of which changes rarely. The indicative values stored in said memory means can easily be modified and since the counter only counts a number of steps equal to the total number of groups of devices for each outstation no time is lost in loose counting.

In a preferred embodiment the master station which is able to address a number of outstations each including two sets of groups of devices, includes a group address counter to form the addresses of these groups of devices. The counter counts from 0 to a first indicative value to form the addresses of the first set of groups belonging to an outstation and immediately thereafter it counts from a second indicative value at least equal to the first one to its end state to form the addresses of the second set of groups belonging to the same outstation. The indicative values stored in a memory can easily be changed for each outstation.

The above and other objects and features of the invention will become more apparent and the invention itself will be best understood by referring to the following detailed description taken in conjunction with the accompanying drawings in which;

DESCRIPTION OF THE PREFERRED EMBODIMENT

Figure 1:
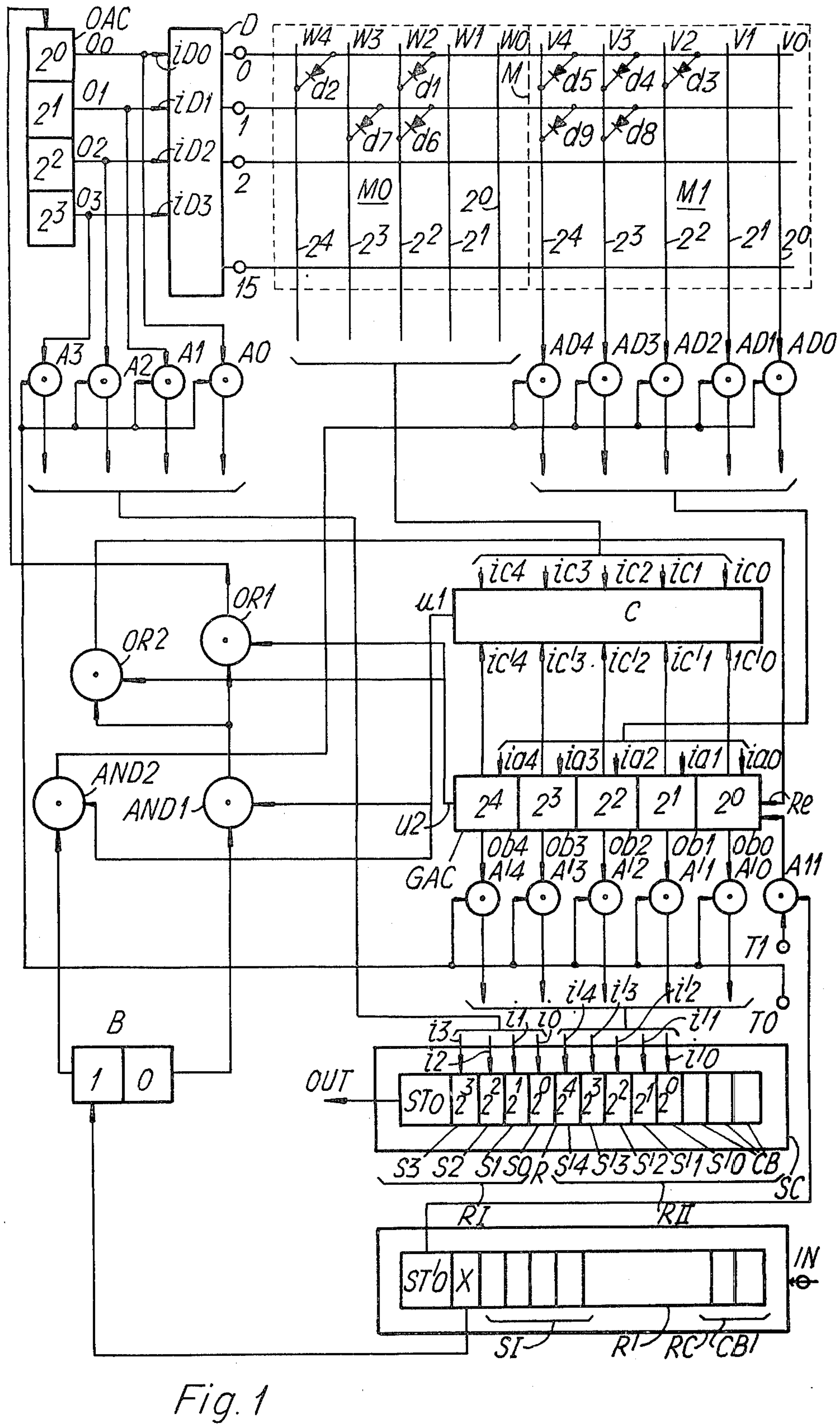
FIG. 1 is a schematic diagram of an embodiment forming part of an addressing system according to the present invention.

The present addressing system is used to address in a master station a number of, for instance 16, outstations (not shown) each of which is supposed to include a number of, at most 31, groups of devices and to collect information regarding these devices. The embodiment represented in FIG. 1 forms part of this master station, wherein the outstations are addressed by means of interrogation code words and wherein the information is received under the form of reply code words well known from the above mentioned article. More particularly, an interrogation code word sent from the master station to a particular outstation includes the addresses of both this outstation and of a group of devices to be addressed therein while a reply code word sent from an outstation to this master station includes the information of the group of devices which has just been addressed by an interrogation code word.

The addresses of the 16 outstations and the groups of devices to be addressed in each of these outstations are formed by means of a 4-stage outstation address counter OAC and a 5-stage group address counter GAC respectively. These counters OAC and GAC are able to count 16 and 32 respectively and accordingly have 4 outputs 00 to 03 and 5 outputs 0b0 to 0b4 respectively. This master station moreover includes an interrogation code word sending circuit SC, a reply code word receiving circuit RC, a memory M with an associated decoder circuit D, a comparator C and logic circuitry including the gates A0 to A3, AD0 to AD4, A'0 to A'4, A11, AND1, AND2, OR1 and OR2 and the bistable device B. This logic circuitry further includes a time pulse source (not shown) able to generate timing pulses *t*0 and *t*1 at its output terminals T0 and T1 respectively. Both these pulses have a period P and the pulses *t*1 are generated after the pulses *t*0.

The sender circuit SC which has an output terminal OUT to send the signals to the outstations includes a shift register R and means (not shown) well known in the art to serially transmit an interrogation code word stored in this shift register to the outstations. The shift register R includes from left to right a stage STO for storing a start bit, a first part RI with stages S3 to S0 to store the bits of weight $2^3$ to $2^0$ of an outstation address respectively, a second part RII with stages S'4 to S'0 to store the bits of weights $2^4$ to $2^0$ of a group address respectively, and further stages CB to store checking bits which will be used in an outstation to check the information transmitted.

The receiver circuit RC which has an input terminal IN to receive the signals from the outstations includes a shift register R' and means (not shown) well known in the art to receive a reply code word from an outstation and to serially store it in the shift register R'. The shift register R' includes from left to right a stage ST'0 for storing a start bit, a stage X for storing a special bit, stages SI to store bits characterizing the stage of the devices of a group which has previously been addressed and further stages CB' to store checking bits to check the information received.

The comparator C is adapted to compare an indicative value with the contents of the counter GAC, while the memory M is adapted to store for each outstation two indicative values. This will be explained later.

The inputs *i*0 to *i*3 and *i'*0 to *i'*4 of the stages S0 to S3 and S'0 to S'4 of the shift register R of the sender circuit SC are connected to the outputs 00 to 03 of the counter OAC and 0b0 to 0b4 of the counter GAC via the AND gates A0 to A3 and A'0 to A'4 respectively. These gates are further controlled by the output terminal T0 of the time pulse source. The above mentioned outputs of the counter GAC are also connected to the 5 inputs *i*C'0 to *i*C'4 of the comparator C respectively.

The 4 outputs 00 to 03 of the counter OAC are also connected to the inputs iD0 to iD3 respectively of the decoder circuit D which is able to decode a 4-bit binary code appearing at the outputs 00 to 03 of the outstation address counter OAC into a 1-out-of-16 code which is then provided at the outputs 0 to 15 of the decoder circuit D, each of the latter codes corresponding to a respective one of the above mentioned 16 outstations.

The output u1 of the comparator C is connected to the parallel connected inputs of the two-input AND-gates AND1 and AND2 the other inputs of which are connected to the 0- and 1- outputs of the bistable device B respectively. The output of the AND-gate AND1 is connected to the reset input Re of the counter GAC via the two input OR-gate OR2 on the one hand and to one of the inputs of a two-input OR-gate OR1 on the other hand. The output of the AND-gate AND2 is connected to the parallel inputs of the two-input AND-gates AD0 to AD4. The output *u*2 of the counter GAC is connected to the parallel inputs of the OR-gates OR2 and OR1, the output of which is connected to the input of the counter OAC.

The output of the stages ST'0 of the shift register R' is connected to one of the inputs of the two-input AND-gate A11, the other input of which is connected to the output terminal T1 of the time pulse source. The output of this AND-gate A11 is connected to the input of the counter GAC. The 1-output of the stage X is connected to the 1-input of the bistable device B.

The memory M is used to store for each of the 16 substations the indicative values of two sets of groups of devices included in these substations. For this reason the memory M is constituted by two submatrices M0 and M1 having 16 common row conductors, each connected to a respective one of the outputs 0 to 15 of the decoder circuit D, and 5 individual column conductors *w*0 to *w*4 and *v*0 to *v*4 respectively. The above mentioned two indicative values for each outstation are formed by connecting or not connecting diodes between the row conductor associated to this outstation and the column conductors *w*0 to *w*4 and *v*0 to *v*4. For instance: the indicative values registered in the submatrices M0 and M1 for the outstation 0 are 10100 and 11100 respectively since diodes *d*1, *d*2 and *d*3, *d*4, *d*5 have been connected only between the row conductor 0 and the column conductors *w*2, *w*4 and *v*2, *v*3, *v*4 and since the row conductors *w*0, *v*0 to *w*4, *v*4 have the weights $2^0$ to $2^4$ respectively. The bits forming the above indicative values appear at the outputs of the wires *w*4 to *w*0 and *v*4 to *v*0 when the conductor 0 is activated due to the counter OAC being in its position 0. Similarly the indicative values registered in M0 and M1 for the outstation 1 are 01100 and 11000 since now diodes *d*6, *d*7 and *d*8, *d*9 are connected between the row conductor 1 and the column conductors *w*2, *w* 3 and *v*3, *v*4 respectively. The bits forming the above indicative values appear at the outputs of the wires *w*4 to *w*0 and *v*4 to *v*0 when the conductor 1 is activated due to the counter OAC having been stepped from its position 0 into the next following one.

When the counter OAC is stepped from its position 0 to its end position 15, the conductors 0 to 15 are activated in succession and corresponding codes are thus formed successively at the outputs of the conductors of the submatrices M0 and M1.

The column conductors *w*4 to w0 are connected to the inputs *i*C4 to iC0 of the comparator C respectively, while the column conductors *v*4 to *v*0 are connected to the inputs ia4 to ia0 of the counter GAC via the AND-gates AD4 to AD0 respectively.

The operation of the above embodiment is described hereinafter.

The number of groups of devices in each outstation may include two sets of groups: a first set comprises a number of groups which consist of devices the condition of which changes rapidly, while a second set comprises a number of groups which include devices the condition of which changes rarely. The information concerning the rapidly changing devices are sent to the master station on a cyclic routine basis, while the information regarding the rarely changing devices, if any, are sent to the master station on a start-on-change routine basis. This means that during a cyclic routine operation each outstation and their groups are interrogated in turn by the master station. In case a change has occurred in one or more of the groups of the above second set in at least one outstation the master station is informed about this change by the reply code word used to transmit information concerning the first group belonging to the first set of this outstation. The fact that this change has occurred is stored in the master station, but the cyclic routine operation for this station is continued and completely executed. Afterwards and for the same outstation a start-on-change routine is then initiated during which the groups of devices belonging to the second set are addressed. When all the groups of the second set have been interrogated, the cyclic routine operation is then started again with the first group address of the following outstation.

First the cyclic routine operation and then the start-on-change routine operation are considered hereinafter:

1. Cyclic routine

It is supposed that initially all the stages of the address counters OAC and GAC as well as the bistate device B are in the 0-condition. This means that the outstation address 0000 and the group address 00000 are registered in these counters OAC and GAC respectively. Moreover the decoder circuit D activates the row conductor 0 of the memory M so that the indicative values 10100 and 11100 appear on the column conductors *w*4 to *w*0 and *v*4 to *v*0 respectively. This indicative value 10100 is stored in the comparator C via the inputs ic4 to ic0. When the outstation with address 0000 must be interrogated this address and the group address 00000 are registered in the stages S3 to S0 and S'4 to S'0 of the shift register R via the gates A3 to A0 and A'4 to A'0 which are enabled by a pulse *t*0 appearing at the output terminal T0 of the time pulse source. By means not shown the start bit stage ST0 is then set to 1, function bits (not shown) indicating that the cyclic routine operation is to be executed are stored in stages CB and check bits are calculated and stored in stages CB. The start bit and the check bits are used to synchronize the master station and outstations and to check in an outstation the data received respectively.

The contents of the shift register R are then serially transmitted to all the outstations but only in one of these stations the outstation address received will be recognized. In this station the group address, the function bits and the check bits are then read and as a consequence thereof a memory storing information about the group of devices having the group address received is addressed by means of this address. This information which is memorized in the outstation due to a regular scanning is then stored in the bits si of a reply code word.

This reply code word includes a start bit st'0, the bits si, check bits cb' and a special bit *x* to indicate whether or not a change has occurred in a device of one of the groups forming the second set of the addressed outstation. The bits of this reply code word are also serially transmitted to the master station where they are registered at their reception in the stages ST'0, SI, CB' and X of the shift register R' of the receiving circuit RC respectively. The start bit and the checking bits of the reply code word have a similar function as those of the interrogation code word and the bit *x* which is 0 in the case no start-on-change has occurred is only provided in the reply code word used to transmit information about the first group of devices of each outstation. It being supposed that the bit *x* is 0 the 1-output shown of the stage X is deactivated so that the bistate device B and one of the inputs of the two-input AND-gate AND1 remain in their 0-state and remain activated respectively. After the reply code word has been registered in the shift register R' it is checked and when everything is correct the input of the two-input AND-gate A11 connected to the output terminal T1 of the time pulse source is activated by a pulse t1. The output of this AND-gate is also activated since the stage ST'0 is in its 1-state. Consequently, the counter GAC is stepped one step further. At a further moment the contents of the counter are transferred to the second part RII of the shift register R since the parallel connected inputs of the AND-gate A'4 to A'0 are activated by a second pulse *t*0. The contents of the first part RI of R remain unchanged since the counter OAC remains in its initial state for reasons which will be explained below. The contents of the shift register RC are then sent to the outstations in the manner described above so that the second group of devices of the first outstation is addressed therein. After the second reply code word has been stored in the shift register R' and has been checked the counter GAC is again stepped one step further by a second pulse *t*1 and its contents are again transferred to the second part RII of the register R by a third pulse *t*0, etc.

Finally, after the reception of the reply code word concerning the last group of devices of the first set and counter GAC is stepped into a position, the corresponding binary value or indicative value of which is inscribed in the comparator C. Consequently the comparator C then delivers an output pulse activating an input of the AND-gate AND1. Since also its other input is activated due to the bistable device B being in its 0-state, the counter GAC is reset and the output of the OR-gate OR' is activated. Since the output of this OR-gate is connected to the input of the counter OAC the latter is stepped one step further and consequently provides the address of the second outstation to be interrogated and activates the second conductor 1 of the memory M via the decoder circuit D. Consequently, the indicative value 01100 is inscribed into the comparator via the input terminals iC4 to iC0. The contents of the counters OAC and GAC are transfered into the shift register R upon the parallel inputs of the gates A3 to A0 and A'4 to A'0 being activated by a pulse *t*0 appearing at the output terminal T0. In the same way as described above interrogation code words are then formed to interrogate the groups of devices of the first set of the second outstation and the information is received from this outstation under the form of reply code words, etc.

2. Start-on-change routine

It is now supposed that a change has occurred in one or more groups of the second set of groups of devices of an outstation. If this change occurs in the groups of the second outstation while the first outstation is being addressed in the cyclic routine, the addressing of the latter outstation continues until all the groups of the first set thereof have been scanned. Then the groups belonging to the first set of the second outstation are addressed (cyclic routine). The master station is informed about the change by the first reply code word received from this second station due to the bit $x$ of this word having been set to 1. This bit sets the stage X of the register R' to the 1-condition thus activating the 1-output of the stage. Consequently, the bistate device B is brought in the 1-state due to which one of the inputs of the AND-gate AND2 is activated whereas one of the inputs of the AND-gate AND1 is inhibited. As already described previously, the other inputs of these gates are activated and the comparator C then produces an output pulse when the counter GAC has stepped a number of steps equal to the number of addresses of the groups of the first set of devices included in the first outstation. The counter has then counted the indicative value corresponding to the groups of devices belonging to the first set since the address 00000 is included therein. When such an output pulse is produced the two-input AND-gates AD4 to AD0 are enabled so that the code or second indicative value at the outputs of the conductors $v$4 to $v$0 is registered in the counter GAC via the input terminals ia4 to ia0. Since it is supposed that the change has occurred in the second outstation the counter contents are hence modified from the binary code 01100 to 11000 which is the address of the first group of the second set of devices in the second outstation being interrogated.

By a pulse $t$0 at the terminal T0 the gates A'4 to A'0 and A3 to A0 are enabled so that the contents of the counter GAC is transfered into the second part RII of the register R, whereas the contents of the first part RI of this register are not changed since the counter OAC has not been allowed to step. In the same way as described above for a cyclic routine operation an interrogation code word is then sent to all the outstations. In the second outstation for which this interrogation word is intended a reply code word giving information about the first group of devices of the second set is sent to the master station and after this reply word has been checked in the latter station the counter GAC is stepped one step further by a pulse $t$1. This start-on-change routine operation continues until all the groups of the second set of the second outstation being interrogated have been addressed. When the last reply code word is received in the master station the counter GAC steps into its final position or end state 11111 thus activating the output $u$2 and hence the outputs of the OR-gates OR1 and OR2. Consequently, the counter GAC is reset and the counter OAC is stepped one step further thus forming the address of the next outstation.

Since the counter first counts from 0 to its first indicative value and thereafter counts from its second indicative value to its end value to form the addresses of the groups of devices for each outstation this second indicative value must be at least equal to the first one in case an outstation is addressed wherein the total number of groups of devices is the highest among the other total numbers of groups in the other outstations, whereas in these other outstations the second indicative value is larger than the first one. Since also the number of steps effectuated by the counter GAC is equal to the total number of groups of devices for each outstation, it is evident that the counting capacity of that counter must be at least equal to the above highest number. Generally the second indicative value is larger than the first one even in the case of an outstation having the highest number of groups of devices since this allows an increase of the number of devices of each set.

Figure 2:
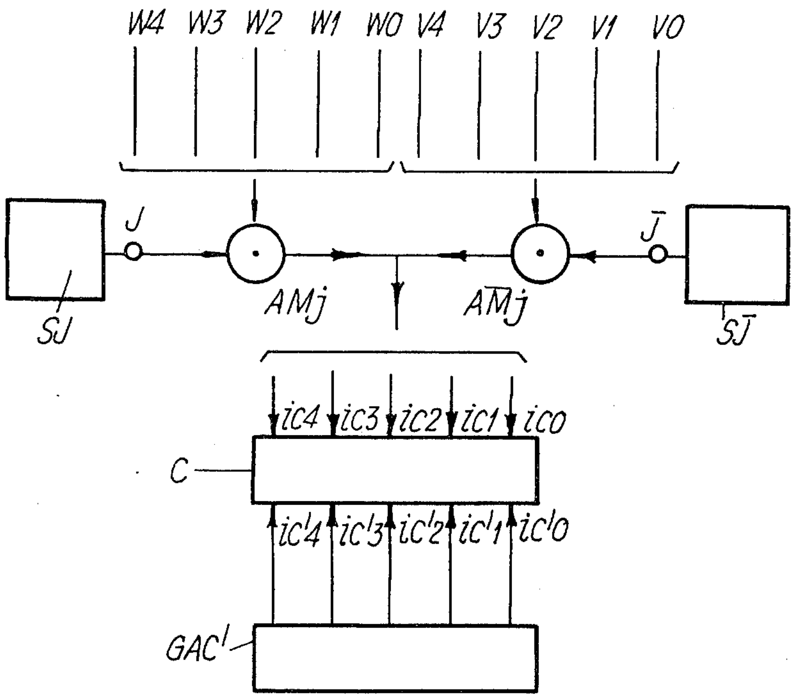
FIG. 2 is a schematic diagram of part of a modification of the embodiment represented in FIG. 1.

Instead of using a counter stepping in the same direction as described above one may however also make use of a bi-directional counter operated in such a way that it counts in one direction from zero to the first indicative value (cyclic routine) whereafter it is brought in its end position and then counts in the opposite direction from the end value to the second indicative value (start-on-change routine). Hereby the comparator C is then used not only to recognize the first indicative value but also to detect the second one. This is illustrated in FIG. 2 which shows the bi-directional counter GAC', the comparator C and a gating circuitry between the column conductors $w$0 to $w$4 and $v$0 to $v$4 of the memory M and the comparator C. This gating circuitry includes the gates AMj ($j$ = 0, . . . 4) and $\overline{\text{AMj}}$ (j = 0, . . . 4). The parallelly connected inputs of the gates AMj and $\overline{\text{AMj}}$ are connected to the output terminals J and $\overline{\text{J}}$ of two sources SJ and $\overline{\text{SJ}}$ respectively. The bits appearing at the output terminals J and $\overline{\text{J}}$ complement each other.

During the cyclic routine the gates AMj and $\overline{\text{AMj}}$ are activated and deactivated respectively and during the start-on-change routine, the gates AMj and $\overline{\text{AMj}}$ are deactivated and activated respectively.

While the principles of the invention have been described above in connection with specific apparatus, it is to be clearly understood that this description is made only by way of example and not as a limitation on the scope of the invention.

I claim:

1. An addressing system in a master station which is able to communicate with a plurality of outstations, each including at least one set of at least one group of devices, said addressing system providing the addresses of said outstations and of said at least one group of devices and adapted to address said at least one group of devices in said outstations by means of said addresses comprising:

a first and second set of at least one group of devices in at least one of said outstations;

memory means for storing for each of said outstations a first value and a second value indicative of the number of addresses of at least one group of devices of said first and second sets;

a counter; and logic means for providing the addresses of said at least one group of devices of said first set of said at least one outstation for stepping said counter through a first number of steps equal to said first indicative value, said logic means providing the addresses of said at least one group of devices of said second set by stepping said counter through a second number of steps equal to a value corresponding to an end position of said counter minus said second indicative value.

2. An addressing system according to claim 1, wherein said second indicative value is at least equal to said first indicative value.

3. An addressing system according to claim 1, wherein to count said first number said counter is stepped from a zero position to a position corresponding to said first indicative value.

4. An addressing system according to claim 1, wherein to count said second number said counter is stepped from a position corresponding to said second indicative value to an end position.

5. An addressing system according to claim 1, wherein to count said second number said counter is stepped from a position corresponding to an end position to a position corresponding to said second indicative value.

6. An addressing system according to claim 1, wherein said master station is informed about a change of state of at least one of said devices of said groups of said second set by the reply of an addressed first group of said first set belonging to a same outstation and that said addresses of said second set are generated after the generation of the addresses of said first set.

* * * * *